United States Patent [19]

Swanson et al.

[11] 4,234,216
[45] Nov. 18, 1980

[54] PIPE SWIVEL JOINT FOR SUBMERGED SERVICE

[75] Inventors: Harold N. Swanson, Anaheim; Cryssis Pashalis, Fullerton, both of Calif.

[73] Assignee: FMC Corporation, San Jose, Calif.

[21] Appl. No.: 914,304

[22] Filed: Jun. 12, 1978

[30] Foreign Application Priority Data

Jan. 7, 1978 [GB] United Kingdom ............... 606/78

[51] Int. Cl.³ .................................................. F16L 35/00
[52] U.S. Cl. ........................................ 285/93; 308/187; 285/94; 285/276
[58] Field of Search ............... 285/276, 94, 93; 184/6, 184/6.11, 8; 308/187

[56] References Cited

U.S. PATENT DOCUMENTS

| | | | |
|---|---|---|---|
| 1,574,211 | 2/1926 | Taylor | 285/94 X |
| 2,398,944 | 4/1946 | Kopetz | 184/6 |
| 2,610,097 | 9/1952 | Shelden et al. | 308/187 |
| 2,770,475 | 11/1956 | Rafferty | 308/187 X |
| 2,969,879 | 1/1961 | Belcher | 308/187 X |
| 3,679,235 | 7/1972 | Follow | 285/276 X |
| 3,884,511 | 5/1975 | Hermanson | 285/93 |
| 3,895,831 | 7/1975 | Fisher | 285/93 |

FOREIGN PATENT DOCUMENTS

49450 1/1917 Sweden ............... 308/187

Primary Examiner—Dave W. Arola
Attorney, Agent, or Firm—L. B. Guernsey; W. W. Ritt, Jr.

[57] ABSTRACT

A pipe swivel joint for use at underwater or other submerged locations provides a system for circulating a lubricant under pressure through the joint's bearing race chamber and for monitoring the lubricant pressure to detect any leaks in the joint. The composition of the circulating lubricant can be analyzed to ascertain when an outward leak of pipe fluid or an inward leak of sea water into the lubricant exists. The leak can be halted by changing the lubricant pressure to match the pressure of the pipe fluid or the pressure of the sea water leaking through a defective seal so that operations can continue until the leak is repaired.

5 Claims, 4 Drawing Figures

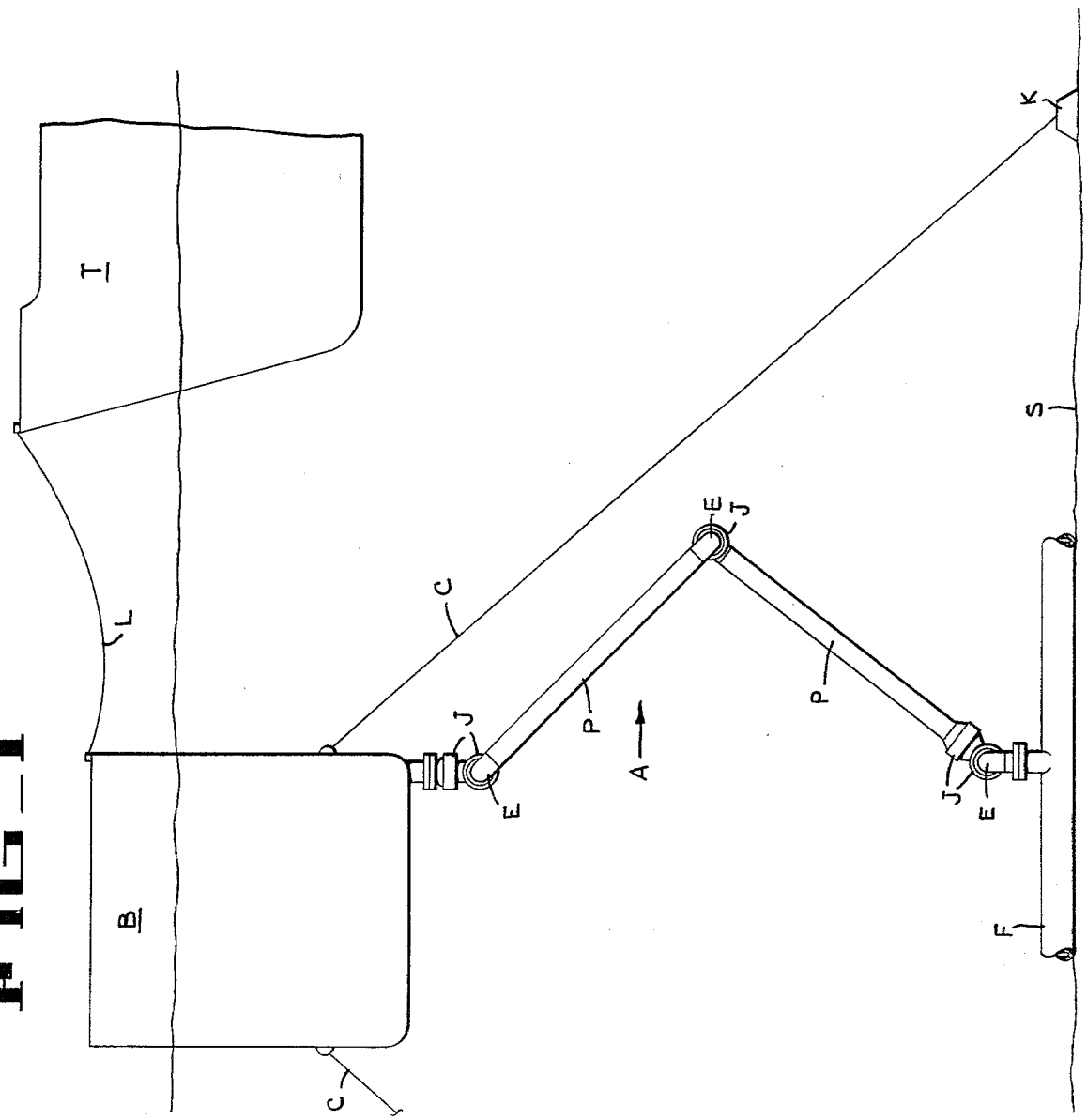

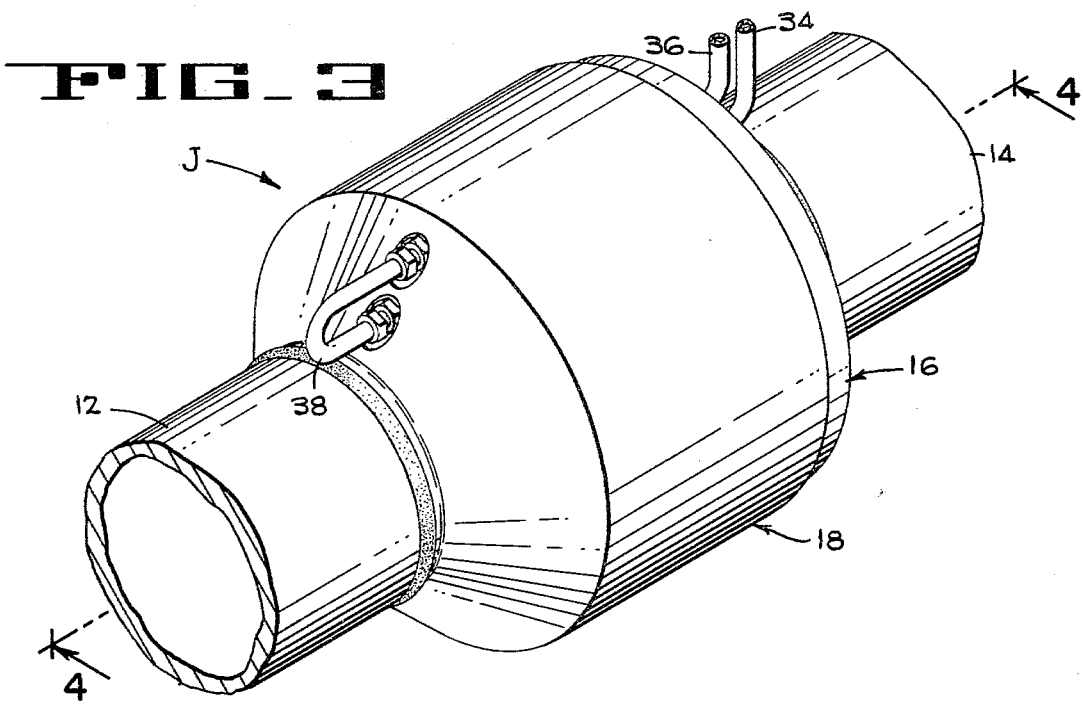
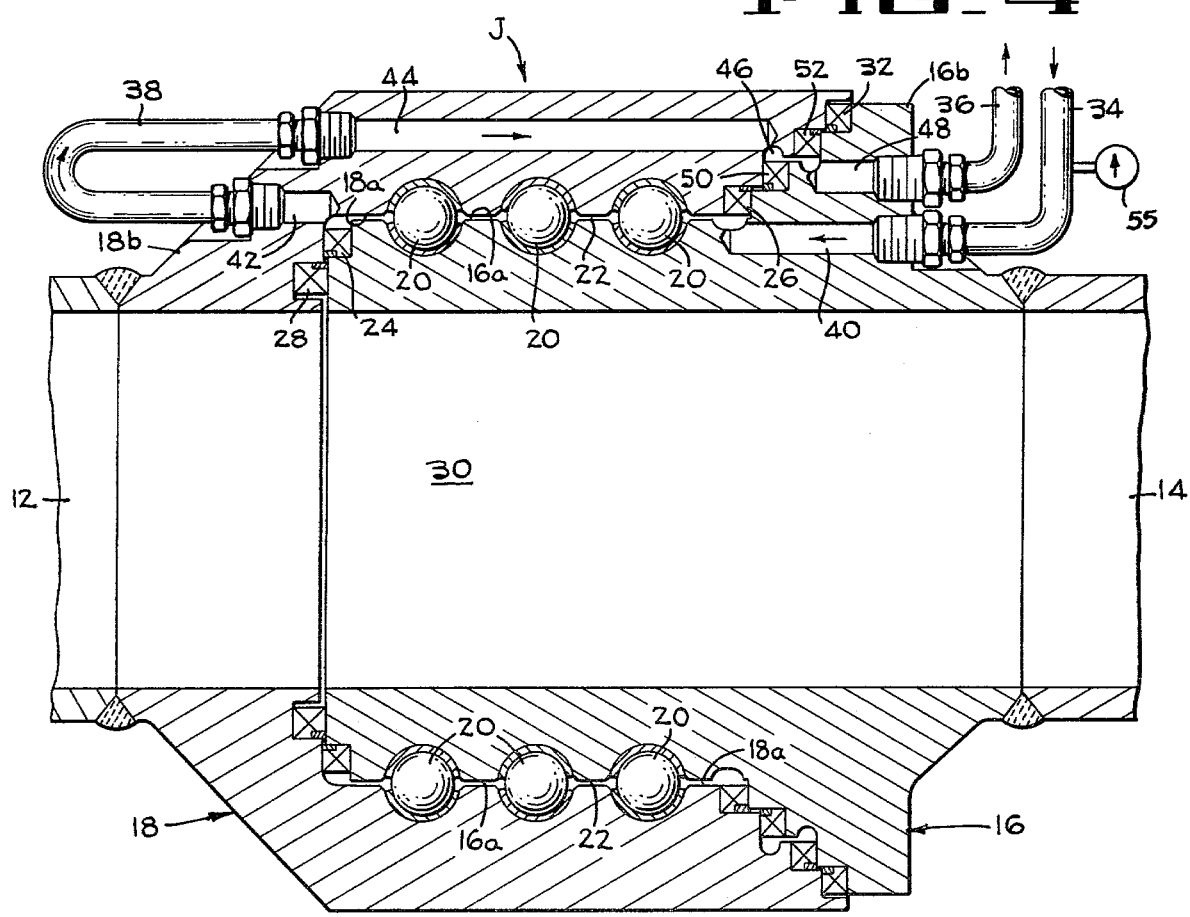

PIPE SWIVEL JOINT FOR SUBMERGED SERVICE

BACKGROUND OF THE INVENTION

1. Field of the Invention

This invention relates to pipe swivel joints, and more particularly, to such swivel joints for use at underwater or other submerged locations.

2. Description of the Prior Art

Pipe swivel joints are commonly used by the oil and gas industry for interconnecting lengths of metal pipe to form an articulated flow conduit between two locations. One of the more modern of such uses is in a product flowline extending between a subsea station on the ocean floor and a buoy or other surface floating facility: for example, an offshore mooring and loading terminal for marine tankers. Swivel joints employed for this purpose are subjected to constant motion, to a corrosive environment, and to relatively high external hydrostatic pressures, and it is imperative that they do not leak either outwardly, thereby polluting the ocean environment, or inwardly and thus contaminate the product in the flowline. Prior to the present invention, a maintenance program involving removal and/or repair of these submerged swivel joints has been necessary to prevent leaks from occurring, and such a program has proved to be both inconvenient and costly.

Rubber or other relatively flexible hose, the obvious alternative to an all-metal articulated flowline, has its own serious drawbacks. It is difficult to construct a large diameter hose for submerged service that will not burst when subjected to brief high pressure surges in the product system, and will not collapse when the product system pressure drops to zero. Furthermore, hoses that will withstand these wide pressure conditions are quite large, inflexible, and difficult to handle, and leakage through this type of hose is likely to occur in a sudden, massive and otherwise dramatic manner that presents little if any possibility of monitoring or minimizing the problem.

It is desirable to provide a product flowline having rigid pipes with swivel joints which can be checked for leaks on a continuing basis without removal of the joints. It is also desirable that a detected leak can be temporarily stopped by remote control without an interruption of the flow of the product through the flowline.

SUMMARY OF THE INVENTION

The present invention overcomes the foregoing problems and disadvantages by providing an improved pipe swivel joint that has a system for circulating lubricant under pressure through the joint's bearing race chamber, so that by monitoring this pressure at a suitable location a leak through the joint's seal system into that chamber can be detected, and by analyzing the composition of the lubricant the direction of the leak, i.e., outwardly or inwardly, can be ascertained. When the leak is outwardly from the joint's product flow passage, the leak can be stopped by increasing the pressure of the lubricant to equalize it with that existing in that flow passage. Similarly, when an inward leak of sea water or whatever other fluid in which the joint is submerged is detected, the leak is halted by changing the lubricant pressure to equal that of the pressure exerted on the device by said sea water or other external fluid. Thus, no matter in which direction the leak occurs, it can be stopped very quickly and efficiently by means of the present invention.

When two or more swivel joints of the present invention are employed in a submerged environment, the lubricant circulating systems of all the joints can be interconnected in any suitable manner that facilitates adequate pressure monitoring and leak stoppage.

BRIEF DESCRIPTION OF THE DRAWINGS

FIG. 1 is a side elevation of an articulated flow conduit having pipe swivel joints according to the present invention.

FIG. 2 is a front elevation of the articulated flow conduit shown in FIG. 1.

FIG. 3 is an enlarged isometric view of a swivel joint of FIG. 1 of the present invention showing the joint connected between two lengths of metal pipe.

FIG. 4 is an enlarged section of the swivel joint, taken along the line 4—4 of FIG. 3.

DESCRIPTION OF THE PREFERRED EMBODIMENT

An articulated flow conduit A with pipe swivel joints according to the present invention comprises a plurality of lengths of pipe P (FIGS. 1 and 2) interconnected by a plurality of pipe elbows E and a plurality of swivel joints J. The upper end of the articulated flow conduit A is connected to a floating buoy B which is anchored into place by a plurality of cables C each connected between the buoy and an anchor K in the seafloor S. The lower end of the articulated conduit A is connected to a flowline F which supplies the oil and/or gas for a marine tanker T which is moored to the buoy B by a line L.

According to the present invention, each of the pipe swivel joints J (FIG. 3) for connecting together a pair of metal pipes 12 and 14 comprises an annular inner or male element 16 (FIG. 4), an annular outer or female element 18 surrounding the male element 16, and a plurality of ball bearings 20 that rotatably interconnect the male and female elements 16, 18. The outer element 18 includes a radially inward extending flange 18b at the left end (FIG. 4) of the swivel joint J. The inner element 16 includes a radially outward extending flange 16b at the right end of the swivel joint J. The ball bearings 20 reside in an annular bearing race chamber 22 that is defined by the outer surface 16a of the element 16, the inner surface 18a of the element 18, and by a pair of annular dynamic fluid seals 24, 26 between the elements 16, 18. The dynamic fluid seal 24 (FIG. 4) is mounted between the inward extending flange 18b and the left end of the inner element 16, and the dynamic fluid seal 26 is mounted between the right end of the outer element 18 and the outward extending flange 16b of the element 16. The swivel joint J also includes an internal primary annular dynamic seal 28 that functions to retain the fluid in the joint's flow passage 30 from leaking outwardly, and an external primary annular dynamic seal 32 that functions to prevent sea water or other external fluid in which the joint is submerged from leaking inwardly.

In order to circulate lubricant through the bearing race chamber 22 the joint J is provided with a fluid circulation system comprising a lubricant supply line 34 (FIG. 4) and a lubricant return line 36 threaded into or otherwise connected to the flange 16b in a fluid-tight manner, and a lubricant jumper line 38 likewise connected to the joint element 18. A fluid inlet passageway 40 in the joint element 16 provides fluid communication between the supply line 34 and the bearing race chamber 22, and similarly a fluid outlet passageway 42 in the joint element 18 provides such communication between the race chamber 22 and the jumper line 38. Fluid communication between the jumper line 38 and return line 36 is provided by a passageway 44 in the outer element 18, an annular lubricant chamber 46 between the joint's inner and outer elements 16, 18, and a fluid return passageway 48 in the inner element 16. Leakage between the elements 16, 18 from the lubricant chamber 46 is prevented by an inner dynamic fluid seal 50 and an outer dynamic fluid seal 52. Thus, with respect to the lubricant system of the swivel joint J as illustrated in the drawings, lubricating fluid under pressure is conducted through the supply line 34 and passageway 40 into the ball race chamber 22, and then returned to the monitoring equipment (not shown) through the jumper line 38, passageway 44, lubricant chamber 46, passageway 48, and return line 36, as indicated by the arrows in FIG. 4.

If the inner primary seal 28 (FIG. 4) should leak, the adjacent bearing chamber seal 24 will be subjected to the pressure of the fluid in the joint flow passage 30, so that equalizing the pressure of the lubricant with that in the flow passage 30 will prevent the leak extending into the race chamber 22. Conversely, if the bearing chamber seal 24 should leak, the inner primary seal 28 will be subjected to the pressure of the lubricant, and a leak of this pressure past the seal 28 into the flow passage 30 can be prevented by adjusting the pressure in the passage 30 to that of the lubricant. If the external primary seal 32 should leak, thereby affecting the seal 52, this leak can be prevented from extending into the lubricant chamber 46 by equalizing the lubricant pressure with the pressure of the outside water or other fluid pressure. Leakage through the seals 32,52 and/or 24,28 can be detected by monitoring the pressure in the lubricant supply line 34, such as by a pressure gauge 55 or other pressure sensitive device coupled to the lubricant line.

The lubricating system of this invention also can be designed to comprise part of a closed loop hydraulic system that could operate hydraulic cylinders, valves, motors, etc., by appropriate modification of the jumper line to extend it to any or all of these additional devices.

Thus, the present invention provides a swivel joint having a simple and convenient means for circulating a lubricant under pressure through the joint and for detecting any outward leaks from the inside of the joint and of detecting any inward leaks from the outside of the joint. Adjusting the lubricant pressure can also halt the leakage so that the swivel joint can continue to be used until a more convenient time is available to repair any leaks.

Constant circulation of the lubricant is not mandatory, but instead may be periodic to permit monitoring of seal integrity and/or to renew the lubricant as needed. The swivel joint J can be used for handling all types of fluid, including liquified gases such as methane and other petroleum products.

Although the best mode contemplated for carrying out the present invention has been herein shown and described, it will be apparent that modification and variation may be made without departing from what is regarded to be the subject matter of the invention.

What is claimed is:

1. A pipe swivel joint for connecting together a pair of pipes useful for submerged service, said joint comprising:
    an annular inner element having an annular groove in the outer surface thereof, said inner element having a radially outward extending flange at one end thereof;
    an annular outer element having an annular groove in the inner surface thereof, said outer element having a radially inward extending flange at one end thereof, said outer element surrounding said inner element;
    bearing means mounted between said outer element and said inner element, said bearing means comprising a plurality of rollable elements residing in a bearing race chamber that is defined by said grooves in the outer surface of said inner element and in the inner surface of said outer element, said bearing means interacting with said annular grooves to hold said joint together;
    a first annular seal mounted between the flange on said outer element and the end of said inner element to provide a fluid-tight seal between said bearing race chamber and an inside of said swivel joint;
    a second annular seal mounted between the flange on said inner element and the end of said outer element to provide a fluid-tight seal between said bearing race chamber and an outside of said swivel joint;
    an inlet passageway connected to a first end of said bearing race chamber;
    an outlet passageway in said outer element connected to a second end of said bearing race chamber;
    a lubricant supply line and a lubricant return line;
    means for connecting said lubricant supply line to said inlet passageway;
    said lubricating supply line providing pressurized lubricating fluid to said bearing race chamber;
    an annular lubricant chamber formed in said outer element in the end adjacent said flange of said inner element;
    means for connecting said annular lubricant chamber to said outlet passageway;
    a return passageway connected between said lubricant return line and said annular lubricant chamber,
    said return passageway and said inlet passageway each being formed in said inner element;
    and means for connecting said lubricant return line to said return passageway in said inner element.

2. A pipe swivel joint as defined in claim 1 wherein said inner element has a plurality of annular grooves in the outer surface thereof and said outer element has a plurality of annular grooves in the inner surface thereof, and including a plurality of ball bearings each residing in a groove in said inner element and in a corresponding groove in said outer element to facilitate rotational movement of said outer element about said inner element.

3. A pipe swivel joint as defined in claim 1 including means for remotely detecting a leak in said swivel joint, and means for coupling said detecting means to said pipe swivel joint.

4. A pipe swivel joint as defined in claim 1 including pressure sensitive means for remote detection of a leak in either of said first and said second annular seals by detecting the pressure in said bearing race chamber, and means for coupling said pressure sensitive means to said bearing race chamber.

5. A pipe swivel joint as defined in claim 1 including pressure sensitive means for remote detection of a leak in either of said first and said second annular seals by detecting the pressure in said bearing race chamber, and means for connecting said pressure sensitive means to said lubricant supply line to detect a change in lubricant pressure due to a leak in either of said seals.

* * * * *